July 16, 1940.  J. A. MANARIK ET AL  2,207,747
VELOCITY METER
Filed Nov. 11, 1936  2 Sheets-Sheet 2
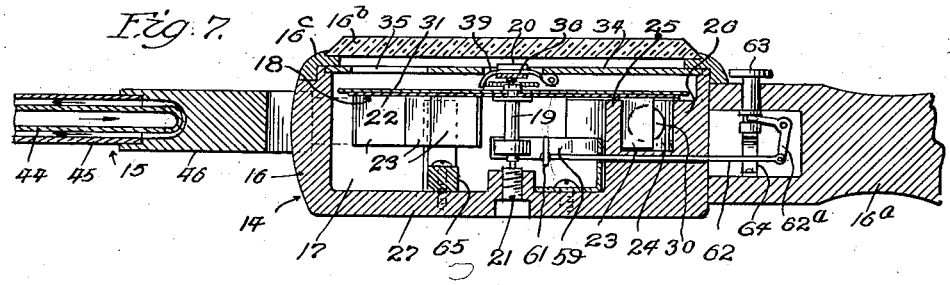
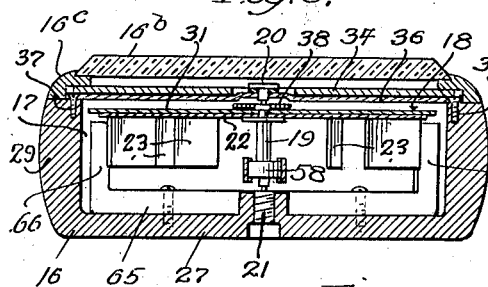
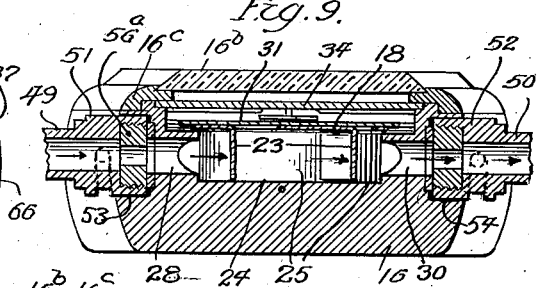
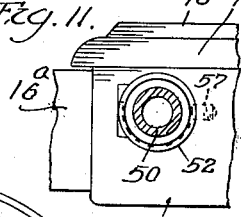
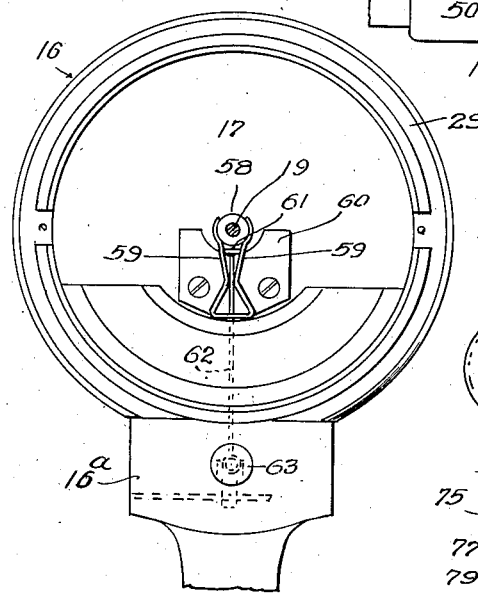
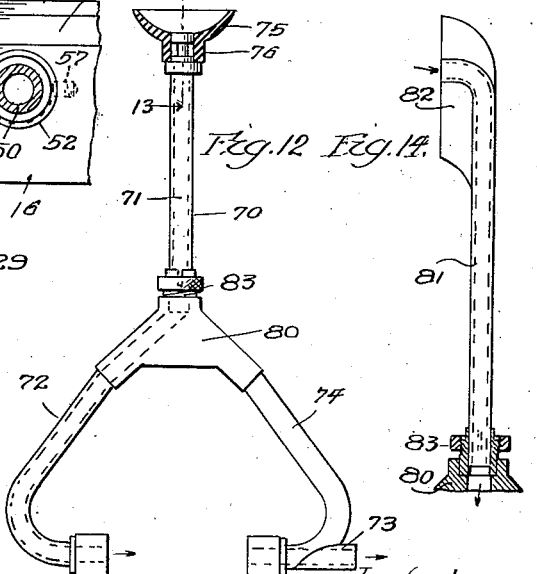

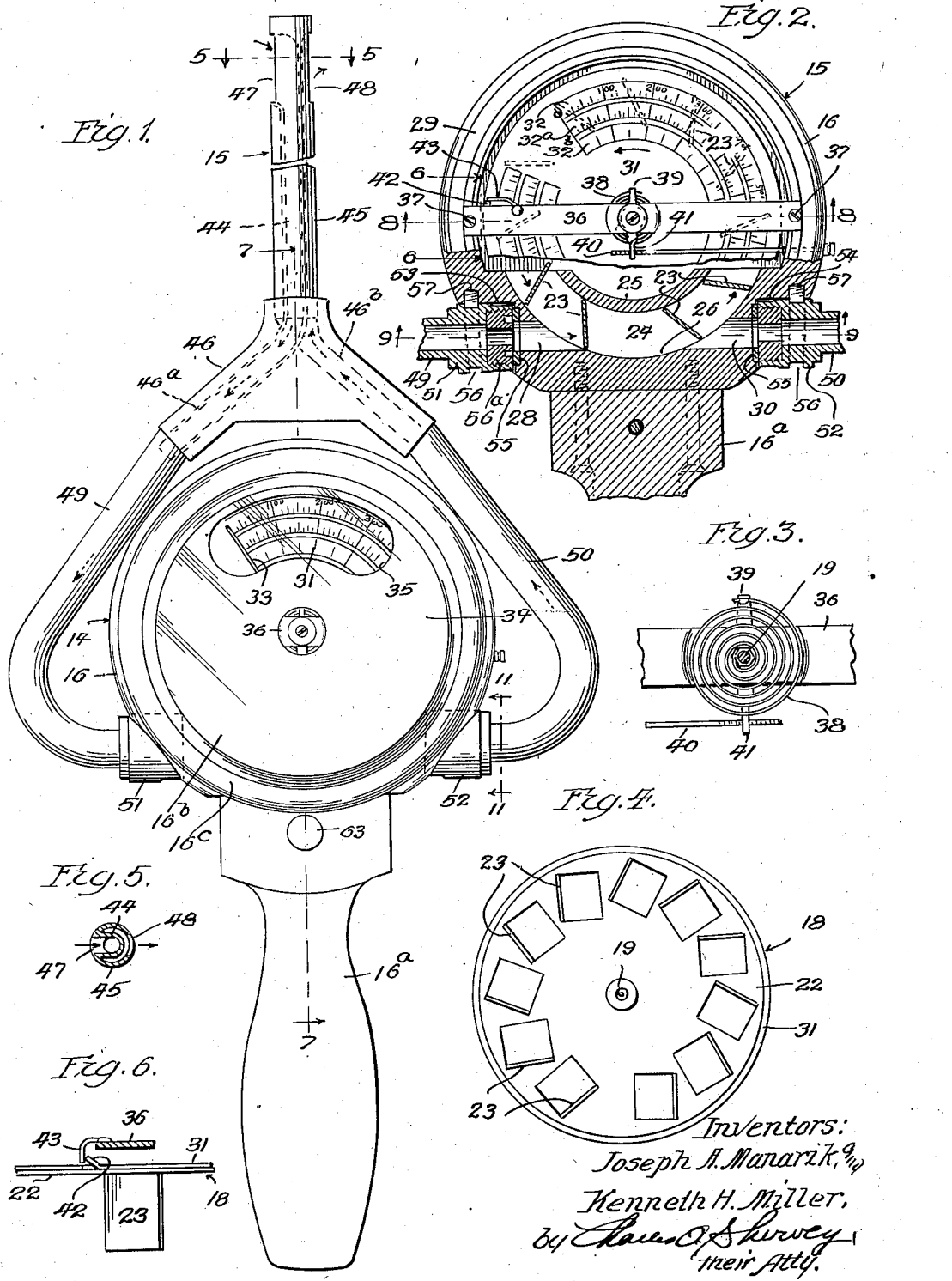

Patented July 16, 1940

2,207,747

UNITED STATES PATENT OFFICE 2,207,747

VELOCITY METER

Joseph A. Manarik and Kenneth H. Miller, Chicago, Ill., assignors to Illinois Testing Laboratories, Inc., Chicago, Ill., a corporation of Illinois Application November 11, 1936, Serial No. 110,296

14 Claims. (Cl. 73—202)

This invention relates to velocity meters and its principal object is to provide an instrument for measuring the velocity of a current of elastic fluid passing through a conduit, or through a grille, or in the open.

Another object is to provide a velocity meter with a rotor and a rotating dial or other indicating element, capable of rotating through 360 degrees, whereby a great range in velocity may be accurately measured.

Another object is to provide an instrument, for measuring the velocity of elastic fluids, provided with a rigid tube for conducting a small portion of the fluid to be measured to the instrument.

Another object is to provide an instrument for measuring the velocity of elastic fluids, provided with a scale calibrated so as to give direct readings in velocity, in volume and in the fluid pressure.

Another object is to provide an instrument for measuring the velocity of elastic fluids, with means for holding the operating mechanism stationary except when being used.

Another object is to provide novel means, whereby the inlet and outlet tubes for conducting the fluid, through the instrument, may be detachably secured to the body of the instrument without the aid of nuts or screws, thereby making the attachment of such parts to the body simple, rapid and efficient.

Another object is to provide an instrument with attachments, whereby readings of a static pressure in a conduit may be obtained, and whereby the velocity of a current of elastic fluid passing to or from a grille, or in the open, may be accurately measured.

With these and other objects and advantages in view, this invention consists in the several novel features hereinafter fully set forth in the following specification and more particularly defined in the appended claims.

One embodiment of the invention is clearly illustrated in the accompanying drawings, in which:

Fig. 1 is a plan of the meter, forming the subject matter of this specification, showing the air inlet and outlet tube partly broken away;

Fig. 2 is a view, partly in plan and partly in horizontal section, of the body portion of the instrument, with its glass cover and a cover plate removed and other parts broken away, to illustrate parts that would be otherwise hidden from view;

Fig. 3 is an enlarged horizontal view, looking from below, of a certain spring and bridge bar employed in the instrument;

Fig. 4 is a view, looking from below, of the rotor;

Fig. 5 is a detail, cross-section, taken on the line 5—5 of Fig. 1;

Fig. 6 is a detail, cross-section, taken on the line 6—6 of Fig. 2;

Fig. 7 is a vertical, longitudinal section, taken on the line 7—7 of Fig. 1;

Fig. 8 is a vertical, cross-section, taken on the line 8—8 of Fig. 2;

Fig. 9 is a vertical, cross-section, taken on the line 9—9 of Fig. 2;

Fig. 10 is a plan of the body portion, with the operating mechanism removed, to illustrate a certain brake mechanism for the rotor;

Fig. 11 is a fragmental side elevation of the body and main tube, the latter being shown in section taken on the line 11—11 of Fig. 1;

Fig. 12 is a plan, partly broken out, of an attachment for taking readings of static pressure;

Fig. 13 is an enlarged, detail, longitudinal section, taken on the line 13—13 of Fig. 12; and Fig. 14 is a plan of an attachment for taking readings of a current of air or gas in the open or in front of a grille.

Referring to said drawings, which are merely illustrative of a simple embodiment of the invention, the reference character 14 designates the body portion of the instrument, and 15 designates an air tube, which is detachably secured to the body portion and is arranged to conduct fluid to and from the instrument. From the body portion extends a handle 16ª by which the instrument is manipulated.

The body portion of the instrument comprises a flat housing 16 of circular form containing a chamber 17, in which is rotatably mounted a rotor 18, provided with an arbor 19 pivoted in bearings 20, 21. A glass crystal or other transparent plate 16ᵇ, held in a bezel 16ᶜ is fastened to the open top of the housing and encloses the mechanism therein.

The rotor desirably comprises a thin metal disc 22, from the lower side of which project a plurality of blades or fins 23 which may be struck up from the metal of the disc and are circumferentially disposed about the margin thereof and preferably extend in tangential directions about the axis of the disc, as is clearly indicated in Figs. 2 and 4. In the chamber of the housing is formed a raised segmental raceway 24, through which the vanes travel whenever the rotor is rotated. The raceway is formed between arcuate walls 25, 26 (see Fig. 2), which project up from the bottom wall 27 of the housing. The upper edges of the walls 25, 26 are disposed somewhat below the upper edge of the housing, as seen in Figs. 7 and 9, and the bottom of the raceway is disposed considerably above the bottom of the chamber 17. The disc portion of the rotor lies directly above the upper edges of the walls 25, 26, and the vanes project down from the disc and while in operation move into and out of the raceway. The blades have some clearances between their edges and the walls of the raceway to permit the flow of fluid past the vanes.

An inlet port 28 enters through the side wall 29 of the housing and an outlet port 30 opens outward through the side wall, said ports being in co-axial alignment and being directed tangentially across the race-way 24, as is clearly seen in Fig. 2, whereby fluid entering the inlet port may pass across the race-way and out through the outlet port, thereby impinging against blades of the rotor and partially rotating the same.

The rotor turns an indicating member, here shown in the form of a dial 31, secured on the top of the rotor and containing one or more annular scales 32, 32ª, 32ᵇ. A cover plate 34 is held in the open top of the housing between the bezel and upper edge of the side wall of the housing and contains an arcuate sight opening 35, through which a portion of the dial is visible. A fine wire 33 extends across the sight opening, as seen in Fig. 1, and lies directly above the dial and co-operates with the scales to indicate the velocity or other quantity.

The dial and disc of the rotor are fastened to the arbor 19 between shoulders at the top of the arbor. The lower bearing stud 21, for the arbor 19 of the rotor, may be in the form of a screw secured in the bottom 27 of the housing, and the upper bearing stud 20 is secured in a bridge bar 36 which extends across the open top of the housing directly below the cover plate 34 and is secured to the upper edge of the side wall of the housing by screws 37. Means, such as a light spiral spring or clock spring 38, is provided for yieldably resisting the pressure of fluid against the vanes of the rotor, one end of said spiral spring being stationarily secured to one arm of a lever 39 and the other end being secured to the arbor 19, as is clearly illustrated in Fig. 3. Adjustment means are provided for the spiral spring, whereby to set the dial at the zero point, and said means are here shown as comprising a rod 40, threaded in an arm 41 of the lever 39 and extending out through the side wall of the housing where it is provided with a knob for its manipulation. The lever 39 is fulcrumed upon the top of the bridge bar 36 by the bearing stud 20. A stop is provided for stopping the rotor and dial when the zero points on the scales coincide with the wire 33, and said stop is shown as comprising an upturned lip 42 (see Fig. 6) formed on the edge of the dial 31 which strikes against a downturned arm 43 fastened to the bridge bar.

The air tube 15, shown in Fig. 1, is used when measuring the velocity of elastic fluid passing through a conduit and, in its present form, said tube comprises an inner tube 44 and outer tube 45, both secured at one end in a Y-shaped block 46 and projecting forward therefrom. The tubes may be of any desired length, and the inner tube opens out through the side of the outer tube at the free end thereof, as at 47, to provide an inlet opening thereto. The annular space between the inner and outer tubes opens out through an outlet opening 48 at the end of the outer tube. Air flows to the instrument through the inner tube and escapes through the space between the two tubes.

Secured to and projecting from the two legs of the Y-shaped block, are two tubular branches 49, 50, that diverge from the block and have their extremities bent toward each other, as seen in Fig. 1, where the extremities are provided with enlargements 51, 52, which are adapted to enter oppositely disposed sockets 53, 54, formed in the side wall of the housing in co-axial alignment with the ports 28, 30. The branches 49, 50 of the air tube may be formed of resilient material, whereby when the enlarged ends thereof are inserted into the sockets 53, 54, they will be firmly pressed against the bottom of the sockets, thereby maintaining air tight passages between the two branches of the air tube and the ports.

The inner tube 44 leads through a passage way 46ª, in the Y-shaped block 46, to the branch 49 of the air tube, and the annular space between the inner and outer tubes 44, 45, opens to a passage way 46ᵇ, which leads to the branch 50 of the air tube. The tubes are soldered or otherwise rigidly secured to the block 46.

Desirably, rubber or fiber gaskets 55 are let into countersinks in the bottoms of the sockets, against which the extremities of the branches of the air tube are pressed, to provide an air seal. Desirably, the enlargements 51, 52 of the air tube branches are formed with helical grooves 56 that receive pins 57 which are secured in the housing and project into the interior of the sockets, as is clearly seen in Figs. 2, 9 and 11. The pin and groove connections between the housing and air tube branches serve to press the enlarged ends of the branches tightly against the gaskets. In attaching the air tube to the housing, the air tube is held at right angles thereto, the enlarged ends slipped into the sockets, the pins entering the grooves and by moving the air tube into alignment with the housing the pins draw the enlarged ends of the air tube branches tightly against the gaskets thereby making tight joints.

With the use of a dial or other indicating element capable of rotation through approximately 360 degrees, the capacity for taking measurements of the velocity of fluids is increased materially. An instrument arranged and proportioned to take measurements up to an arbitrary point, for instance a velocity of 1500 feet per minute, can be used for taking velocity measurements beyond that amount by changing the cross-sectional area of the discharge end of the inlet branch of the air tube, and for this purpose the enlarged end thereof is made hollow and is internally screw threaded to receive any of several apertured bushings, one of which is seen at 56ª. By making the aperture in a bushing smaller, and substituting it for the one shown, the same instrument may be used for taking measurements of the velocity of elastic fluids exceeding that which is measured when the bushing shown is used.

The scale 32 is calibrated to give velocity readings when the bushing 56ª is used, and the scale 32ª is calibrated to give readings when the bushing, having the smaller aperture is used. When the air tube is used with a bushing having a smaller aperture, less fluid passes through the instrument and, as a result, the rotor and dial are rotated though the required arc of a circle to indicate a higher velocity than can be measured when a bushing having a larger aperture is used.

For the purpose of holding the rotor and dial stationary, except when taking readings, a brake mechanism is provided therefor which, in the form shown, comprises a brake drum 58 (see Fig. 10), fast on the arbor 19, and resilient arms 59 which are formed with arcuate jaws that normally grip the brake drum 58 between them. The arms 59 are formed upon and project from the upper end of a bracket 60 which is screwed or otherwise fastened to the bottom of the housing. The arms 59 converge rearwardly toward each other from the jaws, and located between said arms is a small block 61 which is fastened upon one end of a rod 62 that extends out through the housing into a chamber in the handle 16$^a$, where the rod is connected to a bell crank lever 62$^a$, fulcrumed on the handle and engaging the stem of a button 63. A U-shaped spring 64 engaging the lower end of the stem of the button serves to hold the parts in normal position with the block 61 extending across the widest part of the space between the arms 59 and out of contact with the arms. Normally the jaws of the spring arms grip the brake drum and hold the rotor stationary. By depressing the button 63, the block 61 is drawn against the converging parts of the arms 59, thereby spreading them apart and releasing the brake drum, permitting the rotor to rotate. This brake mechanism not only serves to hold the rotor and dial stationary while not in use, but in taking a reading, the user depresses the button and releases the brake, thereby permitting the rotor to move under the influence of the air pressure, and by releasing the button when the measurement has been taken, the rotor and dial will be held in the exact position to which those parts were moved by the air current.

For the purpose of preventing any relative violent movement of the rotor and dial, it is preferred to dampen or slightly retard their action. For this purpose, a permanent magnet 65, having up-turned end extremities 66, may be secured to the bottom of the housing, and the cover plate 34 may be formed of iron. The end extremities or poles 66 are preferably disposed at a radius beyond the outer edges of the vanes 23. The disc 22 of the rotor is also formed of iron and rotates in the magnetic field between the magnet extremities 66 and the cover plate 34, so that its rotatorial movement is slightly retarded, thereby preventing any injury to the delicate mechanism.

The air tube attachment illustrated in Figs. 12 and 13 is intended for use in taking readings of static pressure in a conduit. It is attached to the body portion of the instrument in the same manner as the air tube 15. In this form the air tube 70 has an air inlet passage 71, leading to the extremity of the air tube branch 72, and an outlet air passage is formed through the extremity 73 of the other branch 74, the latter branch being solid. On the end of the air tube 70 is secured a rubber cup 75. The end of the air tube on which the cup is fastened, is solid except for the hereinafter mentioned apertures and fits in the neck 76 of the cup. The solid end is formed with an annular groove 77, surrounded by the neck 76, which arrangement provides an annular channel, and a plurality of ports 78 lead through the solid end to said annular channel, and other ports 79, which are staggered with respect to the ports 78, lead from said annular channel to the hollow of the air tube.

The end of the air tube 70 is disposed at the bottom of the cup so that it cannot be inserted into a conduit when taking readings. By keeping the end of the air tube out of the path of a moving body of air in a conduit, more accurate readings are obtained.

The tube 70 is detachably secured in the Y-shaped block 80 by a coupling 83, and may be removed therefrom. When this attachment is used, the cup 75 is placed over a small orifice in the conduit, thereby permitting the pressure to enter the air tube and pass through the branch 72 thereof into the body of the instrument and to discharge therefrom through the air outlet in the extremity of the branch 74. The scale 32$^b$ of the dial may be used in connection with the pressure measuring attachment and when so used it is calibrated to indicate pressure.

The attachment shown in Fig. 14 is intended for use when taking measurements in the open or in front of a grille. This attachment is in the form of a tube 81, one extremity of which is bent at right angles to the main portion, the other end being arranged to be attached to the Y-shaped block 80 by the coupling 83 in place of the tube 70. The extremity of the air tube 81 is desirably formed with a fin 82 merely for the purpose of indicating the inlet side of the tube.

In using the instrument with the air tube 15 for measuring the velocity of air or other elastic fluid passing through a conduit, the air tube is inserted into the conduit through the small hole in its wall, and the button 63 depressed. Fluid enters the inner tube 44, flows through the branch tube 49 and discharges through the inlet port 28 across the raceway 24, impinging upon the vane 23 next adjacent the inlet port, thereby partially rotating the rotor and dial. The jet of fluid after passing the raceway, discharges through the outlet port 30 into the outlet branch tube 50 and flows out through the annular space between the inner and outer tubes and discharges from the outlet opening at the end thereof back into the conduit.

If the impact of the jet of fluid against the first vane is of sufficient force it will move the first vane far enough through the raceway to bring the next adjacent one in front of the inlet port, so that the jet impinges upon it and continues to rotate the rotor until the next vane in succession is moved in front of the inlet port and so on. In other words, the impact of the fluid exerted against the vanes entering the raceway in front of the inlet port, will continue to rotate the rotor and dial, thereby winding up the spring until the pressure is balanced by the force of the spring, whereupon the rotor and dial will come to a position of rest and the velocity will be indicated on the dial by the wire 33. By releasing the button 63, the rotor is held in the position to which it was moved by the air jet and the dial will be held in such position until the button is again depressed. When used with a conduit of known cross-sectional area, the dial may have a scale thereon calibrated to give readings in volume.

When using the attachment shown in Fig. 12 with the instrument, the rubber cap is pressed against the wall of a conduit around a small orifice therein and the fluid under pressure enters the instrument through the inlet tube, turns the rotor as above described, and discharges through the apertured extremity of the branch 74. The pressure is indicated on the scale 32$^b$ of the dial which is calibrated to give readings of fluid pressures.

When using the attachment shown in Fig. 14, it is substituted for the air tube 70 of the attachment shown in Fig. 12 and attached to the instrument. By holding the inlet opening of the air tube in front of and towards a grille from which a current of air or other gas is passing, the rotor and dial will be rotated, as above described, and the velocity of the air will be indicated upon the scale 32 used for measuring velocities.

From the above it will be observed that with the use of a rotor having a plurality of vanes or fins, the dial may be rotated through a complete circle, and because a vane receives its greatest impact of air or gas and produces the most torque against the spring when the vane is located near the inlet port, a low velocity reading and a 360 degree scale is made possible. Moreover, the use of a rigid air tube enables the instrument to give consistently accurate readings. This is not possible where flexible air tubes are used which are likely to become kinked or deformed. Furthermore, with the use of a brake arrangement for the rotor, there is no likelihood of the delicate mechanism becoming injured due to unnecessary oscillation of the rotor, and, moreover, the rotor and dial may be temporarily held in the position to which they are moved by the air jet when taking measurements.

Furthermore, with the use of a rotating dial, capable of rotating through 360 degrees, it is always possible to read all of the scales at the top end of the meter.

More or less variation of the exact details of construction is possible without departing from the spirit of this invention. We desire, therefore, not to limit ourselves to the exact form of the construction shown and described, but intend, in the following claims, to point out all of the invention disclosed herein.

We claim as new and desire to secure by Letters Patent:

1. In a meter, the combination of a chambered housing, having an arcuate raceway opening at both ends to the chamber and provided with oppositely disposed aligned inlet and outlet ports adjacent the ends thereof, a rotor rotatively mounted in the chamber of the housing and capable of rotation through approximately three hundred and sixty degrees, said rotor having a plurality of circumferentially disposed vanes arranged to travel through the chamber and through the raceway between the inlet and outlet ports, yieldable means for yieldably resisting rotation of the rotor, and an indicating element which is rotatably moved by the rotor.

2. In a meter, the combination of a chambered housing, having an arcuate raceway opening at both ends to the chamber and having also spaced, oppositely disposed inlet and outlet ports aligned with each other and disposed tangentially to the raceway, a rotor rotatively mounted in the chamber of the housing and capable of rotating through approximately three hundred and sixty degrees, said rotor having a plurality of vanes circumferentially disposed about the same and arranged to travel through the chamber and through said raceway between said inlet and outlet ports, magnetic damping means for said rotor, said damping means acting on said rotor at a radius beyond the outer edges of said vanes to permit the aforesaid range of movement of said rotor, a spiral spring, one end of which is stationarily mounted and one end connected with the rotor, and a dial having a scale thereon, said dial being rotated by the rotor.

3. In a meter, the combination of a chambered housing having an arcuate raceway opening at its top and opening at both of its ends to the chamber, said housing having also oppositely disposed inlet and outlet ports opening tangentially to said raceway and arranged in alignment with each other, a rotor rotatively mounted in the chamber of the housing for rotation through approximately three hundred and sixty degrees, and having a disc covering the open top of the raceway, said rotor having a plurality of circumferentially disposed vanes projecting down therefrom and arranged to travel through the chamber and through said raceway, an indicating dial carried by the rotor, a spiral spring, stationarily mounted at one end and connected at its other end to the rotor, and an air tube having branches arranged for connection with the housing at the inlet and outlet ports.

4. In a meter, the combination of a chambered housing having an arcuate raceway therein and having also oppositely disposed inlet and outlet ports opening to said raceway and arranged in alignment with each other, a rotor rotatively mounted in the chamber of the housing and having a plurality of circumferentially disposed vanes arranged to travel through said raceway, means for yieldably resisting rotation of the rotor, an indicating dial carried by the rotor, and an air tube having branches arranged for connection with the housing at the inlet and outlet ports thereof, said air tube having a rubber cap at its free end and an air inlet passage leading therefrom through one branch to the inlet port of the housing, the other branch of said air tube being solid and having an air outlet duct at its connection with the housing.

5. In a meter, the combination of a chambered housing, having an arcuate raceway therein open at its upper side and opening at its ends to the chamber, inlet and outlet ports opening to said raceway in a tangential direction, a disc-like rotor rotatively mounted in the chamber of the housing and covering the open side of the raceway, said rotor having circumferentially disposed blades arranged to travel through said raceway, a spiral spring for yieldably resisting rotation of the rotor, a dial mounted on said rotor and provided with a scale, a cover mounted in the housing and having a sight opening through which a portion of the scale is visible, said cover being composed of magnetic material, and a damping magnet arranged to have its flux pass through said rotor and through said cover.

6. In a meter, an air tube having restricted tortuous air passages at one extremity leading to the interior of the tube, and a pliable cup having a neck secured on said extremity of the air tube, with the air tube extremity disposed at the bottom of the cup.

7. In a meter, the combination of a chambered housing having air inlet and outlet ports, metering mechanism in the chamber of the housing, an air tube having two branches, the extremities of which are adapted to engage the housing over said ports, and pin and groove connections between the housing and branches operative to draw said branch extremities against the housing to make air tight joints therewith upon rotative movement of said air tube relatively to said housing.

8. In a meter, the combination of a chambered housing having an arcuate raceway therein, open at its upper side and opening at both ends to the chamber, there being aligned air inlet and outlet ports in the housing directed across the raceway, a spring returned rotor capable of rotation through approximately three hundred sixty degrees and having an arbor rotatively mounted in the chamber of the housing, said rotor having a disc covering the open side of the raceway and a plurality of circumferentially disposed vanes arranged to travel through the chamber and through said raceway, a dial mounted on said rotor, a brake drum rigidly mounted on the rotor arbor, resilient drum gripping arms and manually operated push button release mechanism for releasing said arms from the drum, said release mechanism being capable of manipulation exteriorly of the housing.

9. In a portable air velocity meter of the class described, the combination of a housing, an air passageway extending through said housing, a rotor pivotally mounted in said housing carrying a plurality of circumferentially disposed vanes responsive to the air flow through said housing, spring means opposing rotation of said rotor, an indicating dial rotating with said rotor, a pointer carried by said housing cooperating with said dial, a brake in said housing for holding said rotor against rotation, a handle extending downwardly from said housing and through which the meter can be held and maneuvered to different positions in the air stream, said handle having a hollow portion, a reciprocable rod having its upper end operatively connected with said brake and extending downwardly into the hollow portion of said handle, a bell crank lever pivotally mounted in said hollow portion and having one arm connected with said rod, and an operating button projecting from said handle for actuating the other arm of said lever and thereby reciprocating said rod to release said brake.

10. In a portable air velocity meter, the combination of a housing, an air passageway extending through said housing, a rotor pivotally mounted in said housing and comprising vane means responsive to the air flow through said air passageway, spring means resisting rotation of said rotor, brake means for holding said rotor against rotation, a self-sustaining extension conduit having one end connecting with said air passageway and having an orifice at its other end adapted to communicate with a region of air flow removed from the meter housing, a handle secured to and projecting from said housing and through which the meter can be held and maneuvered for properly positioning the orifice end of said extension conduit relative to the region of air flow, and control means for said brake means comprising a control member carried by said handle and a control rod within said handle actuated by said member and operative to actuate said brake means.

11. In a portable air velocity meter comprising a housing having an air passageway therein terminating in inlet and outlet ports in opposite side walls of said housing, and including a moving system having a vane movable in said passageway for indicating the velocity of flow therethrough, the combination therewith of an air tube comprising a main tube portion and branches extending therefrom for connection with said housing at the inlet and outlet ports thereof, a resilient sealing cup mounted on the outer end of said main tube portion for engaging over an aperture in a duct or the like, and an air inlet passage leading from the outer end of said main tube portion through one of said branches to the inlet port of said housing, the other branch of said air tube being closed solid from communication with said main tube portion but having an air outlet duct formed therein for venting the outlet port of said housing directly to atmosphere.

12. In a meter of the class described, an air tube for taking static pressure readings through an aperture in a duct or the like, said tube comprising a main passageway, an annular external groove formed in said tube beyond the outer end of said main passageway, a first series of angularly spaced ports extending from the outer extremity of said tube to said annular groove, a second series of angularly spaced ports extending from said annular groove to said main passageway, said second series of ports being located in staggered relation to said first series of ports, and a rubber sealing member comprising a tubular neck portion surrounding said annular groove, and comprising an outer concave cup portion for engaging over the aperture in the duct, the outer extremity of said air tube terminating substantially in the bottom of said cup portion.

13. In a portable air velocity meter comprising a housing having an air passageway therein terminating in inlet and outlet ports in opposite side walls of said housing, and including a moving system having a vane movable in said passageway for indicating the velocity of flow therethrough, the combination therewith of an air tube attachment comprising branch portions, and coupling means coacting between said housing and said branch portions for detachably coupling the latter to said inlet and outlet ports, said coupling means being operative to simultaneously couple both of said branch portions to said housing by rotative movement of said air tube attachment in its entirety relatively to said housing.

14. In a portable air velocity meter comprising a housing having an air passageway therein terminating in inlet and outlet ports in opposite side walls of said housing, and including a moving system having a vane movable in said passageway for indicating the velocity of flow therethrough, the combination therewith of an air tube attachment of inverted Y-shape comprising a main tube portion and two branch portions having inwardly turned ends, and bayonet joint coupling means coacting between said housing and said branch portions for detachably coupling the inwardly turned ends of said branch portions to said inlet and outlet ports, said coupling means being operative to simultaneously couple both of said branch portions to said housing by rotative movement of said air tube attachment in its entirety relatively to said housing.

JOSEPH A. MANARIK.
KENNETH H. MILLER.